United States Patent
Adachi

(10) Patent No.: US 6,609,299 B2
(45) Date of Patent: Aug. 26, 2003

(54) CONNECTING ROD

(75) Inventor: Hideyuki Adachi, Dublin, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 345 days.

(21) Appl. No.: 09/799,819

(22) Filed: Mar. 5, 2001

(65) Prior Publication Data

US 2002/0124685 A1 Sep. 12, 2002

(51) Int. Cl.[7] .............................................. B21D 53/84
(52) U.S. Cl. ............................. 29/888.09; 29/898.07; 29/898.09; 29/521; 384/191.3; 384/296; 384/430; 403/282; 403/285; 403/366
(58) Field of Search ...................... 29/888.09, 888.092, 29/898.07, 898.09, 898.057, 505, 521; 74/579 R, 579 E, 579 F, 594; 123/197.3, 197.4; 384/191.3, 191.4, 216, 268, 296, 430, 510; 103/274, 282, 285, 365, 366

(56) References Cited

U.S. PATENT DOCUMENTS

| | | | | |
|---|---|---|---|---|
| 1,872,600 A | * | 8/1932 | Manning | |
| 1,948,176 A | * | 2/1934 | Hopkins et al. | |
| 3,390,925 A | * | 7/1968 | Fangman | |
| 3,576,353 A | * | 4/1971 | Barker et al. | |
| 4,114,961 A | * | 9/1978 | Pithie | |
| 4,802,269 A | * | 2/1989 | Mukai et al. | |
| 4,845,817 A | * | 7/1989 | Wilgus | |
| 4,856,366 A | * | 8/1989 | Nikolaus | |
| 4,993,134 A | | 2/1991 | Hong et al. | |
| 5,109,605 A | | 5/1992 | Hong et al. | |
| 5,353,500 A | * | 10/1994 | Hoag et al. | |
| 6,280,091 B1 | * | 8/2001 | Martin et al. | |

\* cited by examiner

Primary Examiner—Gregory Vidovich
Assistant Examiner—Eric Compton
(74) Attorney, Agent, or Firm—Rankin, Hill, Porter & Clark LLP; Mark E. Duell

(57) ABSTRACT

An improved connecting rod assembly and method for making a connecting rod wherein the installation of the bearing sleeve members in the large bearing end of the connecting rod is improved. The connecting rod is forged, and then notches are cut in the large bearing end to define a separation plane about which the large bearing end is subsequently separated to form a cap member and a body member. Sleeve bearing members are inserted into the cap member and body member. Free ends of the sleeve bearing members project beyond associated surfaces of the cap and body members a predetermined distance. Upon compressive re-attachment of the cap member to the body member, the free ends of the bearing members are compressed and deformed to provide protrusions that extend into the notch. The protrusions help to prevent rotation of the bearing members relative to the bearing housing.

12 Claims, 2 Drawing Sheets

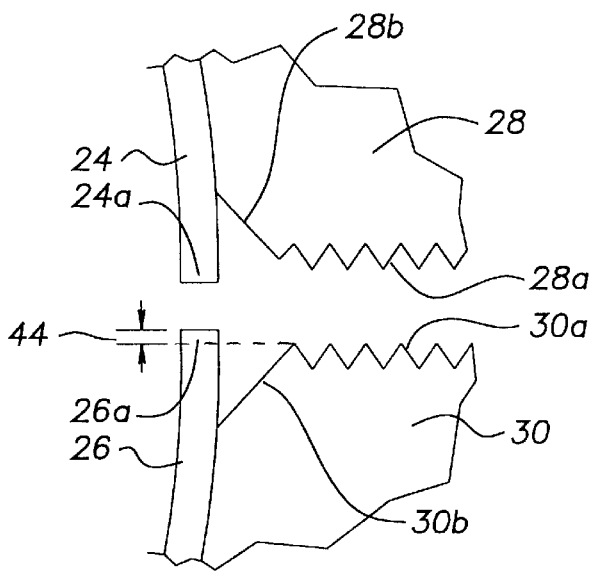
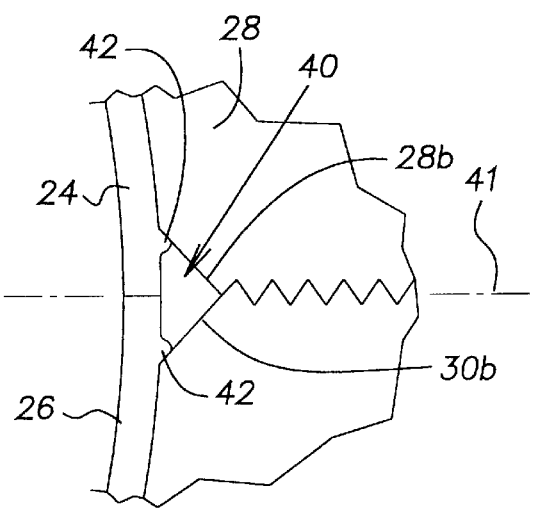
FIG. 3    FIG. 4
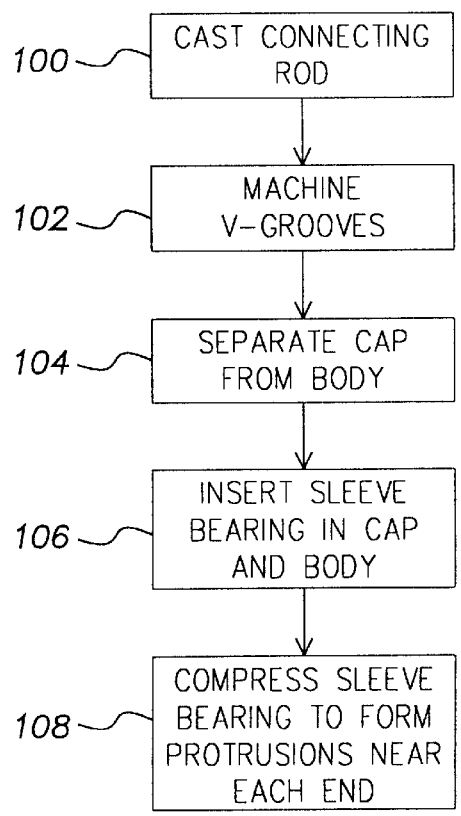
FIG. 5

CONNECTING ROD

BACKGROUND OF THE INVENTION

1. Field of the Invention

The present invention generally relates to connecting rods and, more particularly, to sintered metal connecting rods and methods of manufacturing sintered metal connecting rods.

2. Description of Related Art

One-piece sintered metal connecting rods generally have a large bearing end and a small bearing end. The small bearing end is intended for connection to the piston via the wrist pin and the large bearing end is designed to be connected to the crankshaft. Due to manufacturing and assembly considerations, the small bearing end may remain in one piece, and have a bearing and wrist pin slidably inserted therethrough. However, the large-bearing end must be separated or cut into two pieces in order to permit assembly of the large bearing end around the crankshaft.

Therefore, an end or cap portion at the large bearing end is fractured or broken away from a body portion of the connecting rod to permit subsequent assembly of the connecting rod onto the crankshaft. U.S. Pat Nos. 5,109,605 and 4,993,134, the disclosures of which are expressly incorporated herein by reference in their entireties, are exemplary of such connecting rods, the conventional method of separating the cap from the body, and the conventional cap alignment and attachment procedure.

As shown by these patents, there are known methods of separating the large bearing end along a separating or cracking plane into a cap and a body. The separating plane is defined by grooves that are formed in the large bearing end at the desired separation location. Cracking or separating the cap from the body results in a rough separating surface that can be matingly reattached with considerable precision. The cap and adjacent body portion include shoulders having aligned threaded bores. The cap is adapted to be threadably and compressibly secured to the body so as to cooperate with the body to define a bearing housing that surrounds the crankshaft and receives a pair of half-shell bearing sleeves.

To secure the half-shell bearing sleeves within the bearing housing, the above-referenced patents teach separating the cap from the body, and then machining radial locking-notches in the cap and body on either side of the separating plane. Following assembly, projections or tangs from the half-shell bearing sleeves radially project into the locking notches. The locking notches are oriented transverse to the grooves used to define the separating plane.

Despite the improvements made in the field of connecting rods and, more particularly, fractured sintered-metal type connecting rods, there exists a need for improvement. For example, these connecting rods suffer from the disadvantage that there is no reliable and economical means to prevent the bearing sleeves on the large bearing end from rotating. Apart from the method taught by the above-referenced patents, two methods are currently used. The first relies upon a frictional interference fit that is created when the bearing sleeves are compressed into the bearing housing. The second relies upon the half-shell bearing sleeves providing tabs or other projections that are pressed into a mating or accommodating structure on the face of the bearing housing. This process, which occurs at the end of manufacture, has been found to be unsatisfactory.

Therefore, there exists a need in the art for an improved method of connecting rod assembly wherein the large end bearing is reliably and securely fastened to the connecting rod. There further exists a need in the art for a connecting rod having a large bearing end that is adapted for separation of the cap therefrom, and that is configured to securely receive the bearing sleeve therein. There further exists a need in the art for a bearing sleeve assembly process that will reduce machining steps and manufacturing costs.

SUMMARY OF THE INVENTION

The present invention is directed toward a connecting rod and method of connecting rod assembly that removes or eliminates the disadvantages in the art. The present invention is further directed toward a simplified connecting rod and bearing assembly method that reduces machining and assembly costs.

In accordance with the present invention, a method for manufacture and assembly of a connecting rod includes the steps of casting a connecting rod, cutting a pair of grooves in a large bearing end of the connecting rod to define a separation plane, separating the large bearing end about the separation plane to define a cap member and a body member, inserting a first bearing member in the cap member and a second bearing member in the body member, and securing the cap member to the body member such that free ends of the bearing members are compressed and deformed to form at least one protrusion that extends into one of the pair of grooves and secures the bearing members against rotation relative to the large bearing end of the connecting rod.

In further accordance with the present invention, the pair of grooves are generally V-shaped and defined by a first surface provided by the cap member and a second surface provided by the body member. The protrusion engages one of the first and second surfaces.

In accordance with another aspect of the present invention, a method of forming a connection between a sleeve bearing member and a bearing housing of a connecting rod to prevent rotation of the sleeve bearing member relative to the bearing housing is taught. The sleeve bearing member includes first and second semi-cylindrical sleeve bearing members and the bearing housing includes a cap member and a body member. The cap member has a surface that is adapted for mating engagement with a like surface of the body member. The method includes the steps of inserting the first sleeve bearing member into the cap member and inserting the second sleeve bearing member into the body member, forcing the cap member toward the body member, and compressing at least one free end of the first sleeve bearing member and at least one free end of the second sleeve bearing member to thereby form at least one protrusion that extends from the bearing members and engages the bearing housing.

In further accordance with the present invention, the connection forming method includes forming at least one groove in the bearing housing to define a separation plane, and cracking the bearing housing along the separation plane to separate the cap member from the body member. The at least one groove receives the protrusion from the bearing members.

In accordance with other aspects of the present invention, a connecting rod assembly includes a small bearing end and a large bearing end having a pair of grooves cut therein to define a plane of separation about which the large bearing end is separated into a cap member and a body member. The large bearing end receives a bearing member that includes a first bearing member and a second bearing member. The first bearing member is secured to the cap member and the second bearing member is secured to the body member.

In further accordance with the present invention, the first and second bearing members have free ends that are forced into compressive engagement with one another. The compressive engagement deforms the free ends of the bearing members and creates protrusions that extend into the grooves. The protrusions serve as stops to prevent rotation of the first and second bearing members relative to the large bearing end.

BRIEF DESCRIPTION OF THE DRAWINGS

These and further features of the invention will be apparent with reference to the following description and drawings, wherein:

FIG. 3 is an enlarged plan view of the portion of the large bearing end of the connecting rod shown in FIG. 4 immediately prior to assembly;

FIG. 4 shows an enlarged plan view of the portion of the large bearing end of the assembled connecting rod of FIG. 3, illustrating the mechanical connection between the bearing sleeves and the cap and body of the connecting rod;

FIG. 5 is flow chart illustrating steps in the manufacture and assembly of the connecting rod according to the present invention.

DETAILED DESCRIPTION OF THE PREFERRED EMBODIMENT

Figure 1:
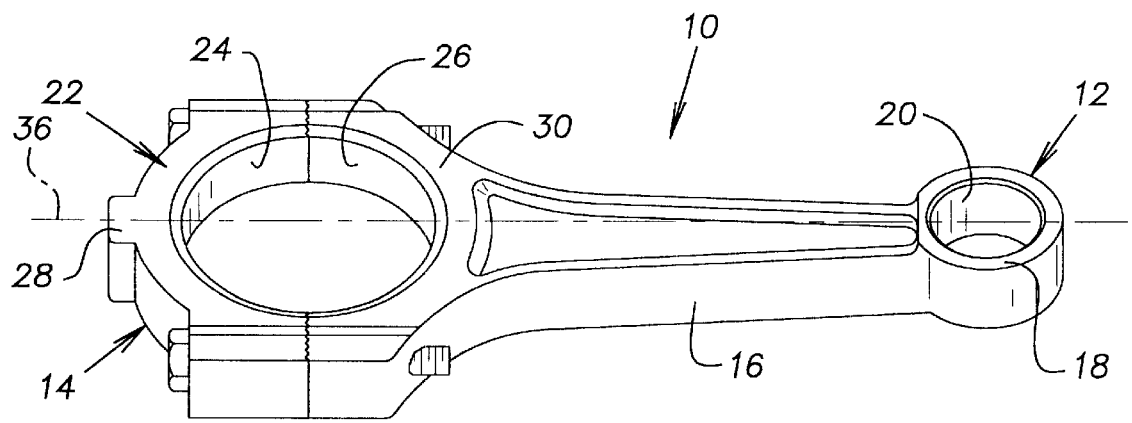
FIG. 1 shows a perspective view of an assembled connecting rod according to the present invention.

With reference to FIG. 1, a connecting rod 10 manufactured and assembled according to the present invention is illustrated. The connecting rod 10 includes a small bearing end 12, a large bearing end 14, and an elongated body 16 interconnecting the small bearing end 12 and the large bearing end 14. The elongated body 16 is preferably I-shaped in cross section, but, naturally, may be replaced by various equivalent structures without departing from the scope and spirit of the present invention.

The small bearing end 12 defines a first or small bearing housing 18 that is adapted to receive a sleeve bearing 20. The sleeve bearing 20 is inserted in the small bearing housing 18 and, in turn, slidably receives a wrist pin (not shown). It is believed that the small bearing end 12 is conventional and, accordingly, will not be discussed further hereinafter.

The large bearing end 14 defines a second or large bearing housing 22 that is adapted to receive a pair of semi-cylindrical sleeve bearing members 24, 26 that cooperate, following assembly, to define a cylindrical slide bearing that is adapted to receive a crankshaft (not shown). The large bearing housing 22 consists of a cap member 28 and a body member 30, the body member 30 being integral with the elongated body 16 of the connecting rod 10. Each of the cap member 28 and body member 30 define a pair of lateral shoulders 32, 34, respectively, that have a threaded bore extending therethrough. The bores of the cap member shoulders 32 are aligned with the bores of the body member shoulders 34 and are parallel to a longitudinal axis 36 of the connecting rod 10. The bores are threaded so as to receive a bolt 38 for compressive coupling of the cap member 28 to the body member 30, to be described hereinafter. Several methods for forming, machining, and threading the bores are well known in the art and, accordingly, this process will not be discussed further hereinafter.

The connecting rod 10 is forged so as to originally form the large bearing housing 22 integrally with the elongated body 16 and the small bearing housing 18 (step 100, FIG. 5). Thereafter, initial machining of the connecting rod 10 may take place. Such machining may include drilling and tapping the shoulders 32, 34, and forming a pair of V-shaped notches or grooves 40 (FIGS. 2–4) in the inner sidewall of the large bearing housing 22 at a location that defines a plane of separation 41 between the cap member 28 and the body member 30 (step 102, FIG. 5). More specifically, a line passing through the bottom or point of the V-shaped grooves 40 and perpendicular to the longitudinal axis 36 of the connecting rod 10 falls upon the separation plane 41. The grooves 40 are preferably cut by a brace and oriented perpendicularly to the longitudinal axis 36 and generally parallel to the centerline of the large bearing housing 22. Preferably, the grooves 40 extend the full thickness of the large bearing housing 22. Subsequent cracking along the separation plane 41 defined by the grooves 40 frees the cap member 28 from the body member 30 (step 104, FIG. 5).

Thereafter, the semi-cylindrical sleeve bearing members 24, 26 that constitute the large sleeve bearing may be inserted into the large bearing housing 22 (step 106, FIG. 5). More specifically, a first semi-cylindrical sleeve bearing member 24 is inserted into the inner circumference or surface of the cap member 28 and a second semi-cylindrical sleeve bearing member 26 is inserted into the inner circumference or surface of the body member 30.

In this regard it is noted that, with reference to FIG. 3, the free ends 24a (only one shown) of the first sleeve bearing member 24 project beyond a separated surface 28a of the cap member 28 and free ends 26a (only one shown) of the second sleeve bearing 26 project beyond the separated surface 30a of the body member 30. The distance 44 that the bearing member free end 24a, 26a projects above the associated separated surface 28a, 30a of the adjacent cap or body member 28, 30 is referred to hereinafter as the "crush height". Preferably, the crush height 44 is identical for each end of the bearing members 24, 26. Alternatively, only one end of each bearing member 24, 26 projects a distance 44 (crush height) beyond the separated surfaces 28a, 30a of the cap member 28 and body member 30, respectively.

FIG. 3 illustrates the situation immediately before compressive re-attachment of the cap member 28 to the body member 30. In this regard, it will be appreciated that although the separated surfaces 28a, 30a of the cap member 28 and body member 30 are shown as being of a regular saw-tooth shape, they actually irregular and random. Moreover, it is noted that angular surface 28b of the cap member 28 and the angular surface 30b of the body member, which previously defined the V-shaped groove 40, were separated from one another upon the cracking or separation of the cap member 28 from the body member 30. In the configuration of FIG. 3, the cap member provides one surface 28b and the body member providing the other surface 30b. As will be appreciated from the drawings and the discussion that follows, the surfaces 28b, 30b are essentially reunited upon compressive securement of the cap member 28 to the body member 30 to generally reform the groove 40.

The free ends 24a, 26a of the first and second sleeve bearing members 24, 26 are placed around the crankshaft (not shown) and aligned with each other, as shown in FIG. 3. Thereafter, the cap member 28 is moved toward the body member 30 by turning the bolts 38 such that the free end 24a of the first sleeve bearing member 24 abuts the corresponding free end 26a of the second sleeve bearing member 26.

Further turning of the bolts 38 into the shoulders of the cap member 28 and body member 30 bring the cap member surface 28a and body member surface 30a into face-to-face contact along the separation plane 41. In so doing, the free ends 24a, 26a of the first and second sleeve bearing members 24, 26 are compressed and deformed, as shown in FIG. 4, such that protrusions 42 are formed near each end of the sleeve members 24, 26 (step 108, FIG. 5). The protrusions 42 extend into the re-formed notch or groove 40 and, preferably, engage the angled surface 28b, 30b of the cap member 28 and the body member 30.

Figure 2:
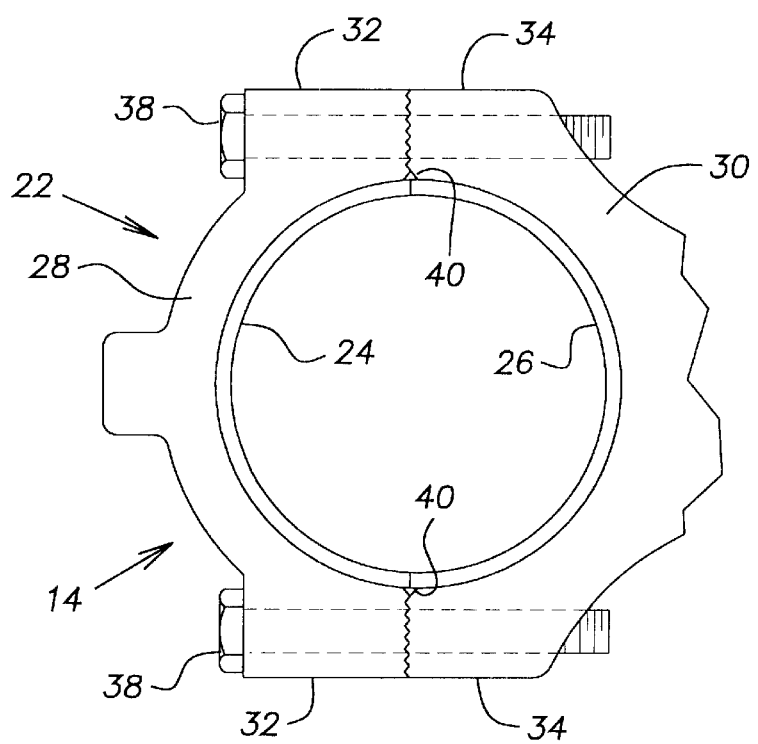
FIG. 2 shows an enlarged plan view of a large bearing end of the assembled connecting rod shown in FIG. 1.

FIG. 2 provides an enlarged view of the fully assembled large bearing end 14 of the connecting rod 10. When assembled, the free ends 24a, 26a of the semi-cylindrical sleeve bearing members 24, 26 meet or engage one another at a location that is generally aligned with the separation plane 41 of the cap member 28 and the body member 30. As noted previously, each of the free ends 24a, 26a of the sleeve bearing members 24, 26 preferably include an outwardly directed protrusion 42 that is useful in preventing the sleeve bearing members 24, 26 from moving relative to the large bearing housing 22.

More specifically, the protrusions 42 prevent the sleeve bearing members 24, 26 from sliding or spinning within the bearing housing 22. It is believed that formation of the sleeve bearing members in situ, while providing obvious assembly advantages, also provides the advantage of automatically compensating for manufacturing or tolerance fluctuations in the sleeve bearing members and the large bearing housing 22. Essentially, the protrusions 42 assist in custom-fitting the sleeve bearing members 24, 26 to the bearing housing 22. Moreover, since the crushing step preferably takes place over the crankshaft, the crankshaft is used as a mandrel or form to radially support the sleeve bearing members 24, 26 during crushing. This is believed to help fit the bearing members to the crankshaft. The formation of the protrusions 42 described hereinbefore also permits locking of the bearing members 24, 26 to the bearing housing 22 without extra machining and assembly steps, but rather relies upon the grooves 40, which were cut to permit separation of the cap member from the body member, to serve as the locking groove into which the protrusions are formed. Accordingly, the grooves 40 not only define the separation plane but also serve as a lock for the bearing members, and thereby reduce machining, assembly, and labor costs associated with the connecting rod.

In experiments conducted by the inventors, a V-shaped groove 40 with a depth of about 0.5 centimeters worked satisfactorily with a first and second bearing having a crush height 44 of 100 $\mu$m. This arrangement provided a resistance to bearing rotation until about 165.2 kgf/cm$^2$ (as compared to 97.9 kgf/cm$^2$ using the prior art method without protrusions). Accordingly, based on these tests the present invention provides a 68.7% increase in the bearing's resistance to rotation.

The present invention has been described herein with particularity, but it is noted that the scope of the invention is not limited thereto. For example, although it is preferred that the bearings are crushed over the crankshaft, it is contemplated that a separate form could be used, if desired. Rather, the present invention is considered to be possible of numerous modifications, alterations, and combinations of parts and, therefore, is only defined by the claims appended hereto.

What is claimed is:

1. A method for manufacture and assembly of a connecting rod, comprising the steps of:

casting the connecting rod, said connecting rod having a small bearing end, a large bearing end, and an elongated body extending between said small bearing end and said large bearing end;

cutting a pair of grooves in said large bearing end to define a separation plane;

separating said large bearing end about said separation plane to separate a cap member of said large bearing end from a body member of said large bearing end, said body member of said large bearing end being integral with said elongated body;

placing a first bearing member on an inner surface of said cap member, said first bearing member having a pair of free ends;

placing a second bearing member on an inner surface of said body member, said second bearing member having a pair of free ends; and, securing said cap member to said body member such that said free ends of said first and second bearing members are compressed and deformed to form at least one protrusion that extends into one of said pair of grooves and secures said first and second bearing members against rotation within said large bearing end of said connecting rod.

2. The method for manufacture and assembly of a connecting rod according to claim 1, wherein said pair of grooves are generally V-shaped and are defined by a first surface and a second surface and wherein, upon separation of said large bearing end into said cap member and said body member, said first surface is provided by said cap member and said second surface is provided by said body member, wherein the protrusion engages one of said first and second surfaces.

3. The method for manufacture and assembly of a connecting rod according to claim 1, wherein each free end of the first and second bearings are deformed to provide a protrusion, and wherein said protrusions extend into said grooves.

4. The method for manufacture and assembly of a connecting rod according to claim 3, wherein said pair of grooves are generally V-shaped and are each defined by a first surface and a second surface and wherein, upon separation of said large bearing end into said cap member and said body member, said first surface is provided by said cap member and said second surface is provided by said body member, wherein the protrusions engage each of said first and second surfaces.

5. The method for manufacture and assembly of a connecting rod according to claim 1, wherein, prior to said securing step, said method comprising the further steps of:

placing said first bearing member and said cap member adjacent a crankshaft; and, placing said second bearing member and said body member adjacent said crankshaft and in alignment with said first bearing member and said cap member.

6. The method for manufacture and assembly of a connecting rod according to claim 5, wherein said pair of grooves are generally V-shaped and are defined by a first surface and a second surface and wherein, upon separation of said large bearing end into said cap member and said body member, said first surface is provided by said cap member and said second surface is provided by said body member, wherein the protrusion engages one of said first and second surfaces.

7. The method for manufacture and assembly of a connecting rod according to claim 5, wherein each free end of the first and second bearings are deformed to provide a protrusion, and wherein said protrusions extend into said grooves.

8. The method for manufacture and assembly of a connecting rod according to claim 7, wherein said pair of grooves are generally V-shaped and are each defined by a first surface and a second surface and wherein, upon separation of said large bearing end into said cap member and said body member, said first surface is provided by said cap member and said second surface is provided by said body member, wherein the protrusions engage each of said first and second surfaces.

9. A method of forming a connection between a bearing and a bearing housing of a connecting rod to prevent rotation of said bearing relative to said bearing housing, said bearing comprising first and second semi-cylindrical sleeve bearing members and said bearing housing comprising a cap member and a body member, said cap member having a surface that is adapted for mating engagement with a like surface of said body member, said method comprising the steps of:

inserting said first sleeve bearing member into said cap member and inserting said second sleeve bearing member into said body member, each of said first and second sleeve bearing members having at least one free end;

forcing said cap member toward said body member;

compressing said at least one free end of said first sleeve bearing member and said at least one free end of said second sleeve bearing member and thereby forming at least one protrusion that extends from one of said first and second sleeve bearing members and engages said bearing housing.

10. A method of forming a connection according to claim 9, comprising the further steps of:

forming at least one groove in said bearing housing to define a separation plane;

cracking said bearing housing along said separation plane to separate said cap member from said body member;

wherein said at least one groove receives said protrusion.

11. A method of forming a connection according to claim 9, wherein each of said first and second sleeve bearing members has a pair of free ends and said protrusion is formed on each free end of said first and second bearing members.

12. A method of forming a connection according to claim 11, comprising the further steps of:

forming a pair of grooves in said bearing housing to define a separation plane;

cracking said bearing housing along said separation plane to separate said cap member from said body member;

wherein each of said grooves receives at least one of said protrusions.

* * * * *